United States Patent
Nielsen et al.

(10) Patent No.: US 7,529,560 B2
(45) Date of Patent: May 5, 2009

(54) INTERSYSTEM CELL RESELECTION FROM GERAN TO UTRAN

(75) Inventors: Sari Nielsen, Espoo (FI); Harri Jokinen, Pertteli (FI)

(73) Assignee: Nokia Corporation, Espoo (FI)

( * ) Notice: Subject to any disclaimer, the term of this patent is extended or adjusted under 35 U.S.C. 154(b) by 487 days.

(21) Appl. No.: 11/129,673

(22) Filed: May 13, 2005

(65) Prior Publication Data

US 2006/0009253 A1 Jan. 12, 2006

Related U.S. Application Data

(60) Provisional application No. 60/578,639, filed on Jun. 10, 2004.

(51) Int. Cl.
*H04M 1/00* (2006.01)
*H04B 7/00* (2006.01)
*H04Q 7/20* (2006.01)

(52) U.S. Cl. .............. 455/552.1; 455/524; 455/525; 455/550.1; 455/556.2; 455/561

(58) Field of Classification Search ... 455/161.1–161.3, 455/168.1, 556.2, 557–558, 560–561, 115.1, 455/524–525, 550.1, 509, 551, 552.1, 514–517, 455/461, 464, 452.1, 452.2, 432.1–432.3, 455/456.3, 67.11, 433–434, 435.1–435.3, 455/436–444, 446–451, 41.2, 62, 63.3, 63.1–63.2, 455/66.1, 453–454, 553.1; 370/331–333, 370/310, 328–329, 338, 341, 348–349, 437, 370/439

See application file for complete search history.

(56) References Cited

U.S. PATENT DOCUMENTS 6,615,044 B2 * 9/2003 Tigerstedt et al. ........... 455/437
6,907,019 B2 * 6/2005 Kotzin et al. ................ 370/332
6,975,881 B2 * 12/2005 Sheynman et al. ........ 455/552.1
6,978,138 B2 * 12/2005 Japenga et al. ............. 455/436
6,990,358 B2 * 1/2006 Seki .......................... 455/560

(Continued)

FOREIGN PATENT DOCUMENTS

AU      2003286743 A1     5/2004

(Continued)

OTHER PUBLICATIONS

TSGR2#6(99)808 Cell Selection and Reselection Criteria, TSG-RAN Working Group 2 (Radio Layer 2 and Radio Layer 3) Sophia Antipolis, France Aug. 16-20, 1999, paragraph 5.2.3.2.

(Continued)

*Primary Examiner*—Meless N Zewdu

(57) ABSTRACT

This invention describes a method for a cell reselection by a mobile station from a serving GERAN cell supported by a GSM/EDGE (global system for mobile communications/enhanced data rates for GSM evolution) radio access network (GERAN) to a UTRAN cell supported by a universal terrestrial radio access network (UTRAN). According to a first embodiment of the invention, the intended intersystem reselection behavior is reached without signaling changes. This can be a preferred mode for early implementations because signaling changes always take a longer time to reach the products on the field (both mobile and network updates are normally required). According to a second embodiment of the invention, the flexibility of signaling changes is used for an advantage.

31 Claims, 3 Drawing Sheets

U.S. PATENT DOCUMENTS

| | | | |
|---|---|---|---|
| 7,035,662 B2* | 4/2006 | Lee | 455/522 |
| 7,096,016 B2* | 8/2006 | Hasegawa | 455/434 |
| 7,127,253 B2* | 10/2006 | Chen | 455/449 |
| 7,248,873 B2* | 7/2007 | Lehtinen et al. | 455/436 |
| 7,307,975 B2* | 12/2007 | Tyra et al. | 370/335 |
| 2002/0177466 A1* | 11/2002 | Laurila et al. | 455/552 |
| 2002/0183086 A1* | 12/2002 | Hallmark et al. | 455/522 |
| 2003/0040311 A1* | 2/2003 | Choi | 455/434 |
| 2004/0082328 A1 | 4/2004 | Japenga et al. | |
| 2004/0109431 A1* | 6/2004 | Abrahamson et al. | 370/342 |

FOREIGN PATENT DOCUMENTS

| | | | |
|---|---|---|---|
| WO | 2004040781 A | 5/2004 | |

OTHER PUBLICATIONS

Change Request 45.008 CR 205 3GPP TSG-GERAN Meeting #19 Cancun, Mexico, Apr. 19-23, 2004 Tdoc GP-040586.

Proposal document "Need to study for Cell Re-selection specificationj changes," Oct. 6, 2004 by Ari Pekka Salovaara.

3GPP TS 45.008 V6.11.0 (Jan. 2005) Radio sub-system link control (Release 6).

3GPP TS 23.122 V7.0.0 (Jan. 2005) NAS Functions related to Mobile Station (MS) in idle mode (Release 7).

3GPP TS 43.022 V6.2.0 (Jan. 2005) Functions related to Mobile Station (MS) in idle mode and group receive mode (Release 6).

3GPP TS 25 304 V6.4.0 (Dec. 2004) User Equipment (UE) procedures in idle mode and procedures for cell reselection in connected mode (Release 6).

Change Request 44.018 CR 368 Rev. 1 5.16.0 Tdoc GP-042211 3GPP TSG-GERAN Meeting #21 Montreal, Canada, Aug. 23-27, 2004.

Change Request 44.060 CR565 Rev. 1 5.12.0 Tdoc GP-042212 3GPP TSG-GERAN Meeting #21 Montreal, Canada, Aug. 23-27, 2004.

Change Request 05.08 CR A379 Rev 8.20.0 Tdoc GP-041918 3GPP TSG-GERAN Meeting #21 Montreal, Canada, Aug. 23-27, 2004.

Change Request 45.008 Rev 1 5.16.0 Tdoc GP-042190 3GPP TSG-GERAN Meeting #21 Montreal, Canada, Aug. 23-27, 2004.

3GPP TSG-GERNAN #19, Tdoc GP-040585, A.I.: 6.1, Cancun, Mexico, Apr. 19-23, 2004, Source:Telia Sonera, Background for WCDMA unlink best characterized by CPICH RSCP and downlink by CPICH Ec/Io.

* cited by examiner

INTERSYSTEM CELL RESELECTION FROM GERAN TO UTRAN

CROSS-REFERENCE TO RELATED APPLICATION

This application claims priority from U.S. Provisional Patent Application Ser. No. 60/578,639 filed Jun. 10, 2004.

TECHNICAL FIELD

This invention is related to intersystem reselection optimisation in mobile communication systems, and more specifically to cell reselection from GERAN to UTRAN.

BACKGROUND ART

Existing 2G to 3G cell reselection is based on a threshold on UTRAN (universal terrestrial radio access network) CPICH (common pilot channel) Ec/No (received energy per PN chip from a CPICH to a total received power spectral density at an antenna connector of a mobile station) and on a UTRAN CPICH RSCP (received signal code power) level relative to the GERAN (GSM/EDGE radio access network) serving cell RXLEV (received signal level). In addition, cell reselection towards UTRAN may be forbidden if the UTRAN target cell suitability criteria S (Srxlev>0 and Squal>0) are not fulfilled (a reselection may still be triggered).

TeliaSonera has suggested a signaling change based improvement with a new threshold value for the UTRAN CPICH RSCP to control reselection from GERAN to UTRAN in addition to existing parameters (see (1) Change Request 45.008 CR 205 #GPP TSG-GERAN Meeting #19 Cancun, Mexico, 19-23 Apr. 2004 Tdoc GP-040586, (2) "Background for WCDMA uplink best characterized by CPICH RSCP and downlink by CPICH Ec/Io," Tdoc GP-040585, and (3) Proposal document "Need to study for Cell Re-selection specification changes," 10.06.04 by Ari-Pekka Salovaara).

Currently there is no threshold for the minimum acceptable UTRAN CPICH RSCP signaled in GSM (global system for mobile communications) when reselecting a UTRAN cell from GERAN. The consequence is that it is impossible to apply an aggressive reselection behavior where the mobile station would reselect an available UTRAN cell whenever the UTRAN cell is suitable (plus a practical hysteresis to avoid ping-pong).

More specifically if the reselection is controlled with the existing Ec/No threshold value only (by setting the RSCP versus RXLEV offset criteria to "minus infinity", i.e., allowing reselection irrespective of the serving cell RSSI [received signal strength indicator] versus the target cell RSCP), the mobile may reselect an unloaded UTRAN cell from too far away where the uplink fails (specifically if that UTRAN cell is at the edge of the UTRAN coverage). On the other hand, while setting the Ec/No threshold sufficiently high (to guarantee an uplink access), the mobile station may not be able to access a loaded UTRAN cell at all or at least the mobile station would need to go far closer to the target UTRAN site than intended by network planning.

The origin of the problem, as explained in the TeliaSonera documents mentioned above, is the fact that the UTRAN CPICH Ec/No varies a lot depending on the load of the UTRAN cell and especially for a cell at the edge of UTRAN coverage. This makes it impossible to set the reselection occurring at a point where the uplink is guaranteed to be operational while at the same time making the mobile station reselect the UTRAN cell whenever both uplink and downlink are operational (basically when both UTRAN CPICH RSCP and Ec/No are at a sufficient level). In the suitability criterion of UTRAN a minimum CPICH RSCP based threshold is included.

DISCLOSURE OF THE INVENTION

The object of the present invention is to provide a method for a cell reselection by a mobile station from a serving GERAN cell supported by a GSM/EDGE (global system for mobile communications/enhanced data rates for GSM evolution) radio access network (GERAN) to a UTRAN cell supported by a universal terrestrial radio access network (UTRAN).

According to a first embodiment of the invention, the intended intersystem reselection behavior is reached without signaling changes. This can be a preferred mode for early implementations because signaling changes always take a longer time to reach the products on the field (both mobile and network updates are normally required). According to a second embodiment of the invention, the flexibility of signaling changes is used for an advantage, thereby this change is intended to be supported less urgently by mobiles and network equipment.

According to a first aspect of the invention, a method for a cell reselection by a mobile station from a serving cell supported by a first radio access technology to a cell supported by a second radio access technology, comprises the steps of: selecting a previous cell supported by the second radio access technology and reading and storing from the previous cell a RSCP suitability threshold; selecting the serving cell by the mobile station; and establishing a reselection criterion by the mobile station for reselecting the cell from the serving cell, wherein the reselection criterion contains at least one threshold value comprising the RSCP suitability threshold plus an offset defined by the mobile station using a predetermined criterion.

According further to the first aspect of the invention, the serving cell may be a serving GERAN cell, the cell may be a UTRAN cell, the previous cell may be a previous UTRAN cell, the first radio access technology may be a GSM/EDGE radio access network (GERAN), the second radio access technology may be a universal terrestrial radio access network (UTRAN) and the RSCP suitability threshold may be a UTRAN RSCP suitability threshold. Further, the method may comprise the step of: determining if the reselection criterion is met for the UTRAN cell and, if it is met, reselecting the UTRAN cell by the mobile station. Still further, before the step of selecting the serving GERAN cell, the method may comprise the step of: selecting a previous UTRAN cell and reading and storing from the previous UTRAN cell the UTRAN RSCP suitability threshold. Further still, the offset may contain a hysteresis value or may be defined using power capabilities of the mobile station.

According to a second aspect of the invention, a computer program product comprises: a computer readable storage structure embodying computer program code thereon for execution by a computer processor with the computer program code characterized in that it includes instructions for performing the steps of the first aspect of the invention indicated as being performed by any component of the mobile station, the GSM/EDGE radio access network (GERAN) or the universal terrestrial radio access network (UTRAN).

According to a third aspect of the invention, a method for a cell reselection by a mobile station from a serving cell supported by a first radio access technology to a cell supported by a second radio access technology, comprises the steps of: selecting the serving cell by the mobile station; and establishing first and second reselection criteria by the mobile station for reselecting the cell from the serving cell, wherein the first reselection criterion contains a threshold value comprising a ratio (Ec/No) of a received energy per PN chip from a common pilot channel (CPICH) to a total received power spectral density at an antenna connector of the mobile station plus an offset added to the ratio by the mobile station, and the second reselection criterion contains a RSCP threshold value, the offset for the ratio and the RSCP threshold value are provided to the mobile station by the serving cell.

According further to the third aspect of the invention, the serving cell may be a serving GERAN cell, the cell may be UTRAN cell, the first radio access technology may be a GSM/EDGE radio access network (GERAN), the second radio access technology may be a universal terrestrial radio access network (UTRAN) and the RSCP threshold value may be a UTRAN RSCP threshold value. Still further, the method may comprise the step of: determining if the first and the second reselection criteria are met for the UTRAN cell and, if they are met, reselecting the UTRAN cell by the mobile station. Yet further still, the UTRAN RSCP threshold value may contain a hysteresis value or defined using power capabilities of the mobile station.

According to a fourth aspect of the invention, a computer program product comprises: a computer readable storage structure embodying computer program code thereon for execution by a computer processor with the computer program code characterized in that it includes instructions for performing the steps of the third aspect of the invention indicated as being performed by any component of the mobile station, the GSM/EDGE radio access network (GERAN) or the universal terrestrial radio access network (UTRAN).

According to a fifth aspect of the invention, a mobile station capable of a cell reselection from a serving cell supported by a first radio access technology to a cell supported by a second radio access technology, comprises: a receiving/transmitting/processing module, responsive to a threshold signal indicative of a RSCP suitability threshold from a previous cell supported by the second radio access technology, for providing a received threshold signal indicative of the RSCP suitability threshold; and a cell reselection block, responsive to the received threshold signal indicative of the RSCP suitability threshold, for establishing a reselection criterion for reselecting the cell from the serving cell, wherein the reselection criterion contains at least one threshold value comprising the RSCP suitability threshold plus an offset defined by the cell reselection block using a predetermined criterion.

According further to the fifth aspect of the invention, the serving cell may be a serving GERAN cell, the cell may be a UTRAN cell, the previous cell may be a previous UTRAN cell, the first radio access technology may be a GSM/EDGE radio access network (GERAN), the second radio access technology may be a universal terrestrial radio access network (UTRAN) and the RSCP suitability threshold may be a UTRAN RSCP suitability threshold. Further, the cell reselection block may determine if the reselection criterion is met for the UTRAN cell and, if it is met, reselecting the UTRAN cell by the mobile station. Still further, the offset may contain a hysteresis value or may be defined using power capabilities of the mobile station. Yet still further, the mobile station may comprise: a memory, for storing the UTRAN RSCP suitability threshold.

According to a sixth aspect of the invention, a mobile station capable of a cell reselection from a serving cell supported by a first radio access technology to a cell supported by a second radio access technology, comprises: a receiving/transmitting/processing module, responsive to a signal from the serving cell indicative of a RSCP threshold value and an offset of a ratio (Ec/No) of a received energy per PN chip from a common pilot channel (CPICH) to a total received power spectral density at an antenna connector of the mobile station, for providing a received signal indicative of the RSCP threshold value and the offset for the ratio; and a cell reselection block, responsive to the received signal indicative of the UTRAN RSCP threshold value and the offset for the ratio, for establishing first and second reselection criteria for reselecting the cell from the serving cell, wherein the first reselection criterion contains a threshold value comprising the ratio (Ec/No) plus the offset added to the ratio, and the second reselection criterion contains the RSCP threshold value.

According further to the sixth aspect of the invention, the serving cell may be a serving GERAN cell, the cell may be a UTRAN cell, the first radio access technology may be a GSM/EDGE radio access network (GERAN), the second radio access technology may be a universal terrestrial radio access network (UTRAN), the RSCP threshold value may be a UTRAN RSCP threshold value, the signal may be a GERAN signal and the received signal may be a GERAN received signal. Further, the cell reselection block may determine if the first and second reselection criteria are met for the UTRAN cell and, if they are met, reselecting the UTRAN cell by the mobile station. Still further, the UTRAN RSCP threshold value contains a hysteresis value or may be defined using power capabilities of the mobile station. Yet further still, the mobile station comprises: a memory, for storing the UTRAN RSCP threshold value, the ratio and the offset.

According to a seventh aspect of the invention, a system utilizing a cell reselection from a GSM/EDGE radio access network (GERAN) to a universal terrestrial radio access network (UTRAN), comprises: a previous UTRAN cell, supported by a universal terrestrial radio access network, for providing a threshold signal indicative of a UTRAN RSCP suitability threshold; a serving GERAN cell, supported by a GSM/EDGE radio access network; a UTRAN cell, supported by a universal terrestrial radio access network; and a mobile station, responsive to the threshold signal indicative of a UTRAN RSCP suitability threshold, for establishing a reselection criterion for reselecting the UTRAN cell from the serving GERAN cell, wherein the reselection criterion contains at least one threshold value comprising the UTRAN RSCP suitability threshold plus an offset defined by the mobile station using a predetermined criterion.

According further to the seventh aspect of the invention, the mobile station may determine if the reselection criterion is met for the UTRAN cell and, if it is met, reselecting the UTRAN cell by the mobile station.

According to an eighth aspect of the invention, a system utilizing a cell reselection from a GSM/EDGE radio access network (GERAN) to a universal terrestrial radio access network (UTRAN), comprises: a UTRAN cell, supported by a universal terrestrial radio access network; a mobile station, responsive to a GERAN signal indicative of a UTRAN RSCP threshold value and an offset of a ratio (Ec/No) of a received energy per PN chip from a common pilot channel (CPICH) to a total received power spectral density at an antenna connector of the mobile station, for establishing first and second reselection criteria for reselecting the UTRAN cell, wherein the first reselection criterion contains a threshold value comprising the ratio (Ec/No) plus an offset added to the ratio by the mobile station, and the second reselection criterion contains a UTRAN RSCP threshold value; and a serving GERAN cell (20-1-A), supported by a GSM/EDGE radio access network, for providing the GERAN signal, wherein if it is determined by the mobile station that the first and second reselection criteria are met for the UTRAN cell, then the UTRAN cell is reselected from the serving GERAN cell by the mobile station.

According to a ninth aspect of the invention, an integrated circuit capable of performing a cell reselection from a serving GERAN cell supported by a GSM/EDGE radio access network (GERAN) to a UTRAN cell supported by a universal terrestrial radio access network (UTRAN), comprises: a receiving/transmitting/processing module, responsive to a threshold signal indicative of a UTRAN RSCP suitability threshold from a previous UTRAN cell supported by the universal terrestrial radio access network, for providing a received threshold signal indicative of the UTRAN RSCP suitability threshold; and a cell reselection block, responsive to the received threshold signal indicative of the UTRAN RSCP suitability threshold, for establishing a reselection criterion for reselecting the UTRAN cell from the serving GERAN cell, wherein the reselection criterion contains at least one threshold value comprising the UTRAN RSCP suitability threshold plus an offset defined by the cell reselection block using a predetermined criterion.

According to a tenth aspect of the invention, an integrated circuit mobile station capable of a cell reselection from a serving GERAN cell supported by a GSM/EDGE radio access network (GERAN) to a UTRAN cell supported by a universal terrestrial radio access network (UTRAN), comprises: a receiving/transmitting/processing module, responsive to a GERAN signal from the serving GERAN cell indicative of a UTRAN RSCP threshold value and an offset of a ratio (Ec/No) of a received energy per PN chip from a common pilot channel (CPICH) to a total received power spectral density at an antenna connector of the integrated circuit, for providing a received GERAN signal indicative of the UTRAN RSCP threshold value and the offset for the ratio; and a cell reselection block, responsive to the received GERAN signal indicative of the UTRAN RSCP threshold value and the offset for the ratio, for establishing first and second reselection criteria for reselecting the UTRAN cell from the serving GERAN cell, wherein the first reselection criterion contains a threshold value comprising the ratio (Ec/No) plus the offset added to the ratio, and the second reselection criterion contains the UTRAN RSCP threshold value.

The advantage of the first mode of the invention is that practically the same behavior as suggested by the prior art can be achieved without signaling changes. This is also an advantage in a sense that a capacity for broadcasting the system information by GERAN is already very full and adding new parameters (e.g., intersystem reselection parameters) may be either not possible, or if these parameters are still added this would make more important extensions impossible in the future.

The advantage of the second mode is that exactly the same mobile behavior can be reached as in the case of the proposed improvements in the prior art but in addition, the network is able to properly control both legacy terminals (those that only comply with the existing reselection rules) and new terminals. Normally the CPICH Ec/No threshold should be set rather high for legacy terminals to prevent mobile stations from periodically reselecting unloaded UTRAN cells while new mobiles can use a more aggressive Ec/No threshold (there is no risk of an uplink failure because that is controlled with the new RSCP threshold).

Also the approach in the invention is more accurate because the uplink failure would be dependent on the mobile station output power capability. A lower RSCP threshold should be accepted in the optimized case for a mobile station with a higher output power capability.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

Figure 1:
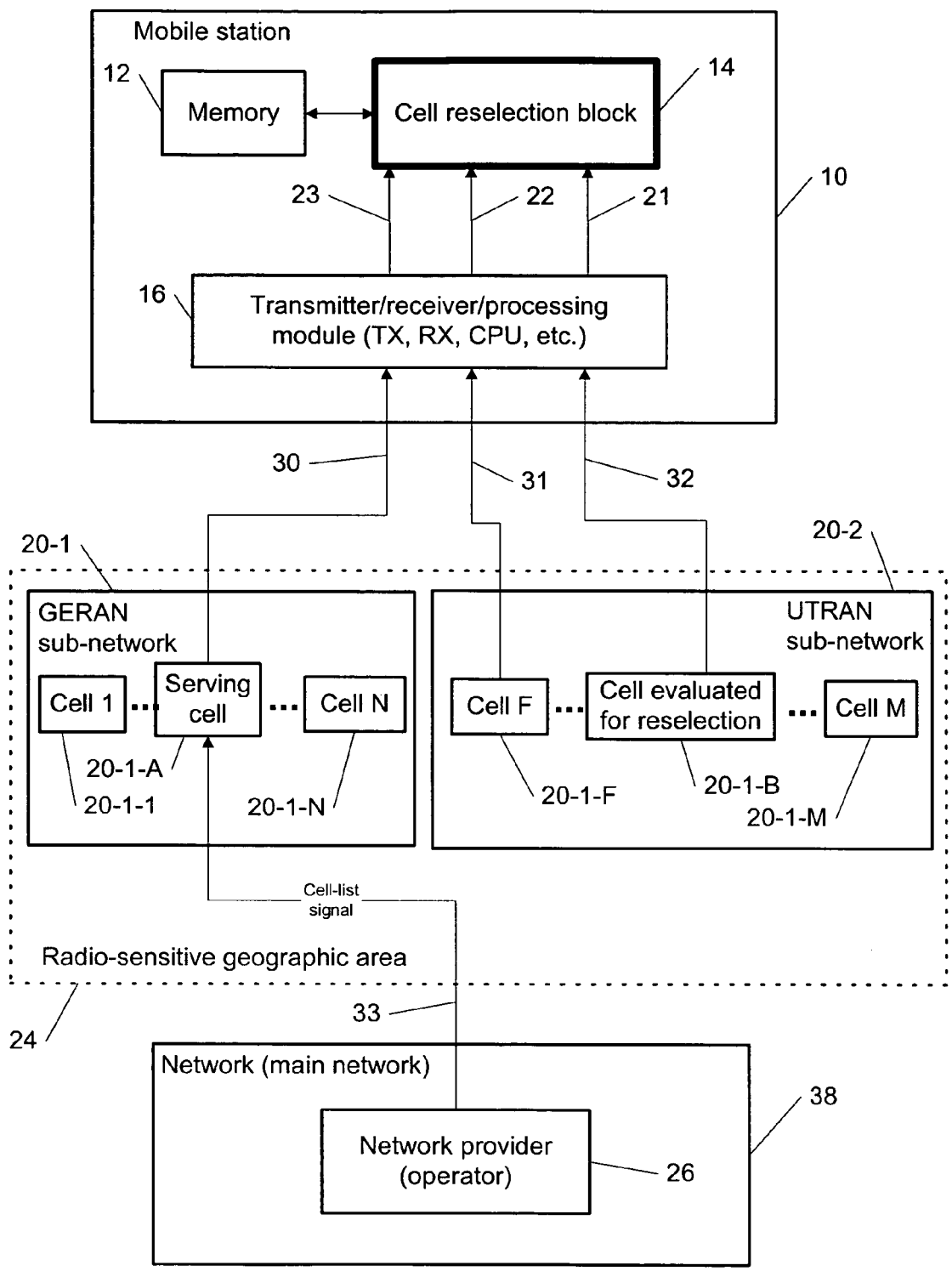
FIG. 1 is a system block diagram illustrating one embodiment of a cell reselection from a GERAN cell to a UTRAN cell by a mobile station, according to the present invention.

The present invention provides a new method for a cell reselection by a mobile station from a serving GERAN cell supported by a GSM/EDGE radio access network (GERAN) to a UTRAN cell supported by a universal terrestrial radio access network (UTRAN).

According to a first embodiment of the invention, the intended intersystem reselection behavior is reached without signaling changes. In the first embodiment of the invention, the threshold value for the intersystem reselection is achieved by using the target UTRAN cell suitability criteria for an advantage. Whenever a reselection is triggered by existing reselection parameters, the mobile station would need to read the target cell system information first in order to evaluate the suitability criteria on that cell. According to the present invention, for any reselection attempt where the reselection was first triggered but the target cell suitability criteria failed, the mobile station will store a RSCP suitability criterion (or a UTRAN RSCP suitability threshold) for that specific cell. This value (i.e. the RSCP suitability criterion), optionally modified with an offset (e.g., using a hysteresis value or taking into consideration mobile station power capabilities), is then can be used as an additional reselection criterion for this specific UTRAN cell and for other UTRAN cells to be evaluated for reselection. The offset (e.g., the hysteresis value) can be fixed by a standard in order to avoid signaling changes or alternatively a new parameter can be added or another feasible hysteresis parameter could be used for this purpose too.

Normally reselection criteria are updated periodically in order to make the mobile station aware of new values if the network started broadcasting modified values. The applicability of the stored UTRAN values could be limited to the same period of time but preferably the validity would not be time dependent. The likelihood of changes is small and the performance degradation would be marginal if the mobile station continues using (once read) UTRAN parameter values after a change in the broadcast values (for a limited period of time this is happening already today). A relatively long validity period would normally allow the mobile station to avoid reading parameters from the same candidate cell repeatedly as the mobile station likely would move to an area of other cells. A preferred validity trigger would still be an event-based cause, like reselection or location area change. According to a second embodiment of the invention, the flexibility of signaling changes is used for an advantage. In the second embodiment of the invention, not only a threshold value against the UTRAN CPICH RSCP is added to the reselection criteria but, in addition, an offset for the UTRAN CPICH Ec/No is added to be used for reselection evaluation by those mobile stations that do support the new UTRAN RSCP threshold value. Furthermore, contrary to the prior art, it is suggested that the hysteresis and/or the mobile station output power capability are taken into account in the RSCP acceptance criterion in order to properly cope for mobile stations with different output power capabilities.

Thus, in the first embodiment, an additional memory in the mobile station for the UTRAN RSCP suitability threshold for a specific number (at least one) of UTRAN cells needs to be implemented. In the second embodiment, the mobile station needs to be upgraded to support new reselection parameters.

FIG. 1 is an example, among many others, of a system block diagram illustrating one embodiment of a cell reselection from a GERAN cell to a UTRAN cell by a mobile station 10, according to the present invention;

In the example of FIG. 1, the mobile station 10 comprises a cell reselection block 14, a memory 12 and a transmitter/receiver/processing module 16. The cell reselection block 14 is a key block for implementing the present invention and all steps performed by the mobile station 10 related to the cell reselection can be coordinated and originated by the cell reselection block 14.

According to the present invention, the block 14 can be implemented as a software or a hardware block or a combination thereof. Furthermore, the block 14 can be implemented as a separate block or can be combined with any other standard block of the mobile station 10. The cell reselection block 14 can store and retrieve the pertinent cell information described in the present invention using the memory 12. Again, the memory 12 can be implemented in a variety of different ways. It can be a part of a general memory of the mobile station 10 or it can be a separate dedicated area (e.g., subscriber identity module (SIM), etc.). Finally, the mobile station 10 contains a transmitter/receiver/processing block 16 which can be implemented in a plurality of ways, as well known in the art. Typically, the module 16 can include a transmitter, a receiver, a CPU, an I/O block, etc. Basically, the module 16 is for providing an effective communication of the cell reselection block 14 with the network as described in detail below.

FIG. 1 shows at least two sub-networks 20-1 (a GERAN type) and 20-2 (a UTRAN type) in a radio-sensitive geographic area 24 for the mobile device 10. Each sub-network of these two sub-networks 20-1 and 20-2 can contain a number of cells, e.g., a sub-network 20-1 contains N cells 20-1-1 . . . 20-1-A, . . . , 20-1-N, and sub-network 20-2 contains N cells 10-2-F . . . 20-2-A, . . . , 20-2-N. As described in more detail in regard to FIGS. 2 and 3, the mobile station 10 can camp on, e.g., on a GERAN serving cell (e.g., cell 20-1-A) of the sub-network 20-1, on a UTRAN cell evaluated for reselection, (e.g., cell 20-1-B) of the sub-network 20-2 or on a previously selected (before selecting the serving cell 20-1-A) UTRAN cell 20-1-F.

The network 38 usually contains a network provider (or a network operator) 26, which provides (in context of the present invention) a cell list signal 33, e.g., to the GERAN serving cell 20-1-A, containing a list of cells (both GERAN and UTRAN cells) which can be evaluated for the reselection from the GERAN serving cell 20-1-A.

Figure 2:
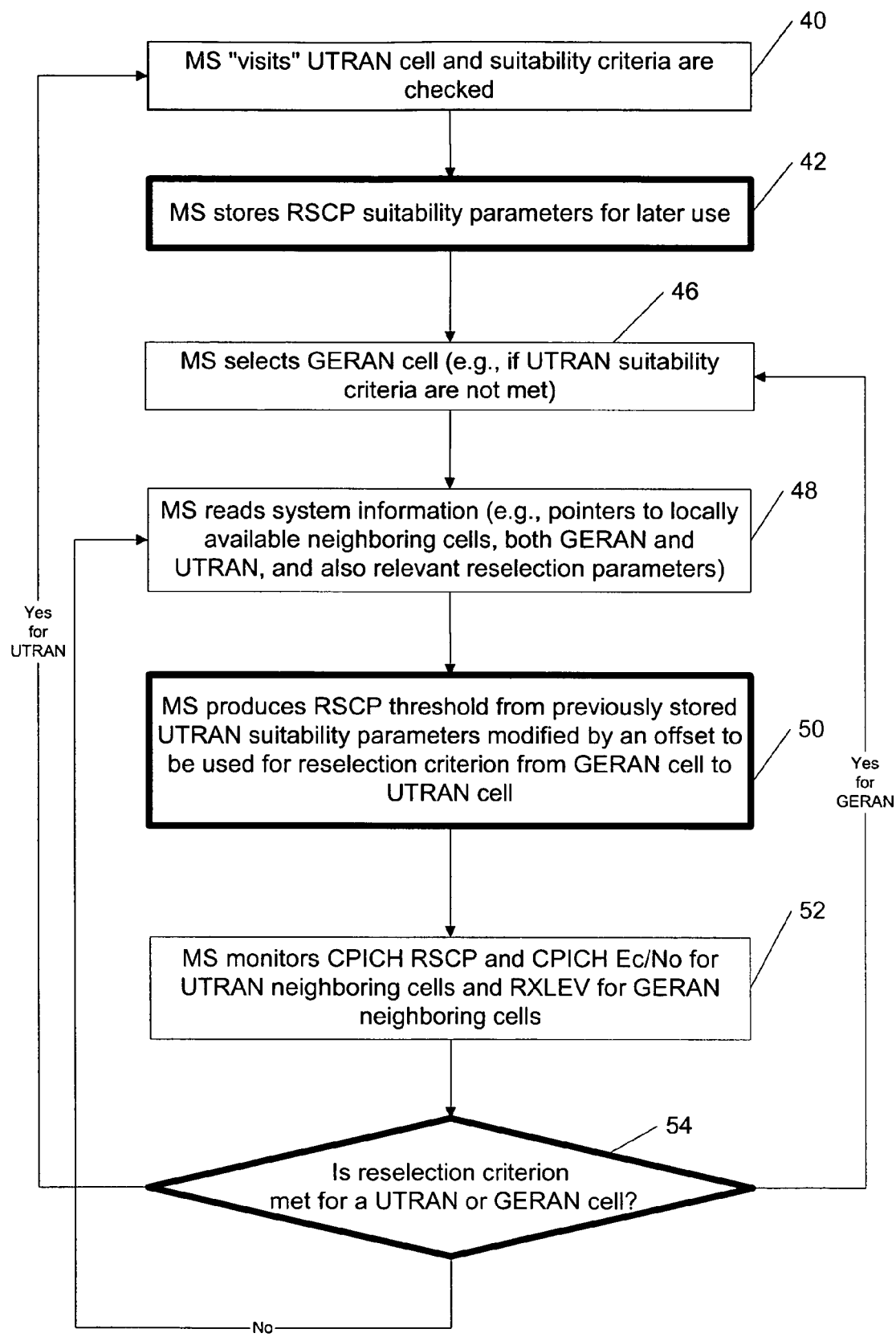
FIG. 2 is a flow chart illustrating one embodiment of a cell reselection from a GERAN cell to a UTRAN cell by a mobile station, according to the present invention.

FIG. 2 is a flow chart illustrating the first embodiment of the cell reselection from the GERAN cell (e.g., the serving cell 20-1-A) to the UTRAN cell (e.g., the UTRAN cell 20-1-B) by the mobile station 10, according to the present invention;

The flow chart of FIG. 2 only represents one possible scenario among many others. In a method according to the first embodiment of the present invention, in a first step 40, the mobile station (MS) 10 camps on or "visits" the UTRAN cell (or previous UTRAN cell) 20-1-F and suitability criteria are checked (read). In particular, the receiving/transmitting/processing module 16 in response to a threshold signal 31 (see FIG. 1) indicative of a UTRAN RSCP suitability threshold from the UTRAN cell 20-1-F provides a received threshold signal 22 (see FIG. 1) indicative of said UTRAN RSCP suitability threshold to the cell reselection block 14.

In a next step 42, the MS 10 stores RSCP suitability parameters (i.e., as a UTRAN RSCP suitability threshold) for later use (e.g., the UTRAN RSCP suitability threshold is stored in the memory 12). If the UTRAN suitability criteria are not met for the UTRAN cell 20-1-F, in a next step 46, the MS selects the GERAN cell 20-1-A. In a next step 48, the MS 10 (i.e., the cell reselection block 14) reads (see corresponding signals 30 and 23 in FIG. 1) system information (e.g., pointers to locally available neighboring cells, both GERAN and UTRAN, and also relevant reselection parameters).

In a next step 50, the MS 10 (i.e., the cell reselection block 14) produces a RSCP threshold value (or "threshold value") from the previously stored UTRAN suitability parameters (or UTRAN RSCP suitability threshold) modified by an offset; said threshold value is used for reselection criterion from GERAN cell to UTRAN cell. The offset can include a hysteresis value or can be defined using the power capabilities of the MS 10 (as was pointed out above). In a next step 52, the MS 10 (i.e., the cell reselection block 14) monitors (see corresponding signals 32 and 21 in FIG. 1) a UTRAN CPICH RSCP level (using the criterion established in step 50) and a CPICH Ec/No (this criterion is defined per the prior art) for UTRAN neighboring cells and a RXLEV for GERAN neighboring cells (which are selected to be evaluated for the reselection).

In a step 54, it is determined whether the reselection criteria are met for a UTRAN or a GERAN cell under evaluation for the reselection. If the reselection criterion (per the prior art) is met for the GERAN cell, the process goes to step 46 and a new GERAN cell is reselected. However, if the reselection criterion (established in step 50) is met for the UTRAN cell (e.g., the cell 20-1-B), the process goes to the step 40 and a new UTRAN cell is possibly reselected (see step 40 above).

Figure 3:
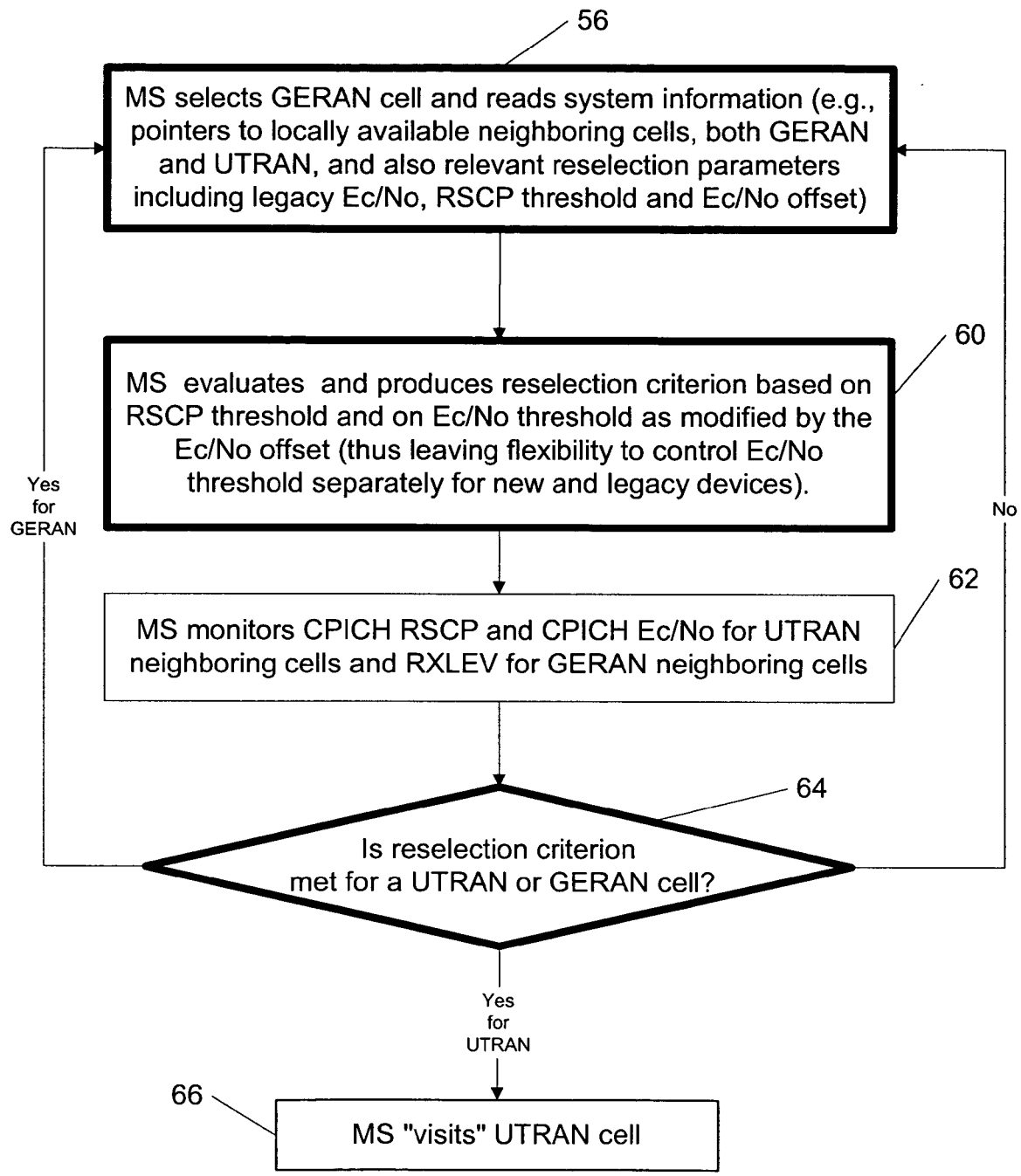
FIG. 3 is a flow chart illustrating another embodiment of a cell reselection from a GERAN cell to a UTRAN cell by a mobile station, according to the present invention.

FIG. 3 is a flow chart illustrating the second embodiment of the cell reselection from the GERAN cell (e.g., the serving cell 20-1-A) to the UTRAN cell (e.g., the UTRAN cell 20-1-B) by the MS 10, according to the present invention.

The flow chart of FIG. 3 only represents one possible scenario among many others. In a method according to the first embodiment of the present invention, in a first step 56, the MS 10 selects the GERAN cell 20-1-A and reads (see corresponding signals 30 and 23 in FIG. 1) system information (e.g., pointers to locally available neighboring cells, both GERAN and UTRAN), and also relevant reselection parameters. In particular, the receiving/transmitting/processing module 16 in response to the GERAN signal 30 (see FIG. 1) indicative of a UTRAN RSCP threshold value and of an offset of a ratio (Ec/No) of a received energy per PN chip from a common pilot channel (CPICH) to a total received power spectral density at an antenna connector of a mobile station provides a received GERAN signal 23 indicative of said UTRAN RSCP threshold value and said offset for said ratio Ec/No to the cell reselection block 14.

In a next step 60, the MS 10 (i.e., the cell reselection block 14) evaluates and produces the reselection criterion based on the UTRAN RSCP threshold value and on the Ec/No threshold as modified by the Ec/No offset (thus leaving flexibility to control the Ec/No threshold separately for new and legacy devices as explained above). The UTRAN RSCP threshold value can include a hysteresis value or can be defined using the power capabilities of the MS 10 (as was pointed out above).

In a next step 62 (similar to step 52), the MS 10 (i.e., the cell reselection block 14) monitors (see corresponding signals 32 and 21 in FIG. 1) the UTRAN CPICH RSCP level (using the criterion established in step 60) and the CPICH Ec/No (using the criterion established in 60) for UTRAN neighboring cells and the RXLEV for GERAN neighboring cells (which are selected to be evaluated for the reselection).

In a step 64, it is determined whether the reselection criterion is met for a UTRAN or a GERAN cell under evaluation. If the reselection criterion (per the prior art) is met for the GERAN cell, the process goes to step 56 and a new GERAN cell is reselected. However, if the reselection criterion (established in step 60) is met for the UTRAN cell (e.g., the cell 20-1-B), the process goes to step 66 and a new UTRAN cell is possibly reselected.

It is noted that according to an embodiment of the present invention the intersystem cell reselection described in the present invention can be applied to a variety of emerging radio access technologies and not be exclusively related to the present implementations of GERAN and/or UTRAN based systems.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   reading and storing by a mobile station a received signal code power suitability threshold from a previously used cell supported by a second radio access technology;
   selecting by said mobile station a cell supported by a first radio access technology; and
   establishing a reselection criterion by said mobile station for reselecting a further cell supported by the second radio access technology from said cell, wherein said reselection criterion contains at least one threshold value comprising said received signal code power suitability threshold plus an offset defined by said mobile station using a predetermined criterion.

2. The method of claim 1, wherein said cell is a GERAN cell, said further cell is a UTRAN cell, said previously used cell is a previously used UTRAN cell, said first radio access technology is a GSM/EDGE radio access network, and said second radio access technology is a universal terrestrial radio access network.

3. The method of claim 2, wherein said further cell is said previously used cell supported by the second radio access technology.

4. The method of claim 1, further comprising:
   determining if said reselection criterion is met for said further cell and, if it is met, reselecting said further cell by said mobile station.

5. The method of claim 1, wherein said offset contains a hysteresis value or is defined using power capabilities of the mobile station.

6. A computer program product comprising: a computer readable storage structure embodying computer program code thereon for execution by a computer processor with said computer program code, wherein said computer program code comprises instructions for performing the method of claim 2.

7. A method comprising:
   selecting by a mobile station a cell supported by a first radio access technology; and
   establishing first and second reselection criteria by said mobile station for reselecting a further cell supported by a second radio access technology from said cell, wherein said first reselection criterion contains a threshold value comprising a ratio of a received energy per PN chip from a common pilot channel to a total received power spectral density at an antenna connector of said mobile station plus an offset added to said ratio by said mobile station, and said second reselection criterion contains a received signal code power threshold value, said offset for said ratio and said received signal code power threshold value are provided to said mobile station by said cell supported by the first radio access technology, wherein said offset is not added to said ratio if said mobile station does not support said received signal code power threshold value.

8. The method of claim 7, wherein said cell is a GERAN cell, said further cell is a UTRAN cell, said first radio access technology is a GSM/EDGE radio access network, and said second radio access technology is a universal terrestrial radio access network.

9. The method of claim 7, further comprising:
   determining if said first and said second reselection criteria are met for said further cell and, if they are met, reselecting said further cell by said mobile station.

10. The method of claim 7, wherein said received signal code power threshold value contains a hysteresis value or is defined using power capabilities of the mobile station.

11. A computer program product comprising: a computer readable storage structure embodying computer program code thereon for execution by a computer processor with said computer program code, wherein said computer program code comprises instructions for performing the method of claim 8.

12. An apparatus, comprising:
   a processing module, responsive to a threshold signal indicative of a received signal code power suitability threshold from a previously used cell supported by a second radio access technology, configured to provide a received threshold signal indicative of said received signal code power suitability threshold; and
   a cell reselection block, responsive to said received threshold signal indicative of said received signal code power suitability threshold, configured to establish a reselection criterion for reselecting a further cell supported by said second radio access technology from a cell supported by a first radio access technology, wherein said reselection criterion contains at least one threshold value comprising said received signal code power suitability threshold plus an offset defined by said cell reselection block using a predetermined criterion.

13. The apparatus of claim 12, wherein said cell is a GERAN cell, said further cell is a UTRAN cell, said previously used cell is a previously used UTRAN cell, said first radio access technology is a GSM/EDGE radio access network, and said second radio access technology is a universal terrestrial radio access network.

14. The apparatus of claim 12, wherein said cell reselection block is configured to determine if said reselection criterion is met for said further cell and, if it is met, to reselect said further cell.

15. The apparatus of claim 12, wherein said offset contains a hysteresis value or is defined using power capabilities of the apparatus.

16. The apparatus of claim 12, further comprising:
a memory, configured to store said received signal code power suitability threshold.

17. The apparatus of claim 12, wherein an integrated circuit comprises the cell reselection block and the processing module.

18. An apparatus, comprising:
a processing module, responsive to a signal from a cell supported by a first radio access technology, said signal being indicative of received signal code power threshold value and an offset of a ratio of a received energy per PN chip from a common pilot channel to a total received power spectral density at an antenna connector of said apparatus, configured to provide a received signal indicative of said received signal code power threshold value and said offset for said ratio; and
a cell reselection block, responsive to said received signal indicative of said received signal code power threshold value and said offset for said ratio, configured to establish a first reselection criterion and a second reselection criterion for reselecting a further cell supported by a second radio access technology from said cell supported by the first radio access technology, wherein said first reselection criterion contains a threshold value comprising said ratio plus said offset added to said ratio, wherein said offset is not added to said ratio if said apparatus does not support said received signal code power threshold value, and said second reselection criterion contains said received signal code power threshold value.

19. The apparatus of claim 18, wherein said cell is a GERAN cell, said further cell is a UTRAN cell, said first radio access technology is a GSM/EDGE radio access network, said second radio access technology is a universal terrestrial radio access network and said received signal is a GERAN received signal.

20. The apparatus of claim 18, wherein said cell reselection block is configured to determine if said first reselection criterion and said second reselection criterion are met for said further cell and, if they are met, to reselect said further cell.

21. The apparatus of claim 18, wherein said received signal code power threshold value contains a hysteresis value or is defined using power capabilities of the apparatus.

22. The apparatus of claim 18, further comprising:
a memory, for storing said received signal code power threshold value, said ratio and said offset.

23. The apparatus of claim 18, wherein an integrated circuit comprises the cell reselection block and the processing module.

24. A system, comprising:
a UTRAN cell, supported by a universal terrestrial radio access network, configured to provide a threshold signal indicative of a UTRAN received signal code power suitability threshold;
a GERAN cell, supported by a GSM/EDGE radio access network;
a further UTRAN cell, supported by a universal terrestrial radio access network; and
a mobile station, responsive to said threshold signal indicative of the UTRAN received signal code power suitability threshold, configured to establish a reselection criterion for reselecting said further UTRAN cell from said GERAN cell, wherein said reselection criterion contains at least one threshold value comprising said UTRAN received signal code power suitability threshold plus an offset defined by said mobile station using a predetermined criterion.

25. The system of claim 24, wherein said mobile station is configured to determine if said reselection criterion is met for said further UTRAN cell and, if it is met, to reselect said further UTRAN cell.

26. A system, comprising:
a UTRAN cell, supported by a universal terrestrial radio access network;
a GERAN cell, supported by a GSM/EDGE radio access network, for providing a GERAN signal; and
a mobile station, responsive to the GERAN signal indicative of a UTRAN received signal code power threshold value and an offset of a ratio of a received energy per PN chip from a common pilot channel to a total received power spectral density at an antenna connector of said mobile station, for establishing a first reselection criterion and a second reselection criterion for reselecting said UTRAN cell from said GERAN cell, wherein said first reselection criterion contains a threshold value comprising said ratio plus an offset added to said ratio by said mobile station, and said second reselection criterion contains the UTRAN received signal code power threshold value, wherein said offset is not added to said ratio if said mobile station does not support said UTRAN received signal code power threshold value.

27. The system of claim 26, wherein said mobile station is configured to determine if the first reselection criterion and said second reselection criterion are met for said UTRAN cell and, if it is met, to reselect said UTRAN cell supported by the second radio access technology.

28. An apparatus, comprising:
means for processing, responsive to a threshold signal indicative of a received signal code power suitability threshold from a previously used cell supported by a second radio access technology, for providing a received threshold signal indicative of said received signal code power suitability threshold; and
means for reselection, responsive to said received threshold signal indicative of said received signal code power suitability threshold, for establishing a reselection criterion for reselecting a further cell supported by said second radio access technology from a cell supported by a first radio access technology, wherein said reselection criterion contains at least one threshold value comprising said received signal code power suitability threshold plus an offset defined by said means for reselection using a predetermined criterion.

29. The apparatus of claim 28, wherein said means for reselection is configured to determine if said reselection criterion is met for said cell and, if it is met, to reselect said further cell.

30. A apparatus , comprising:
   means for processing, responsive to a signal from a cell supported by a first radio access technology, said signal being indicative of a received signal code power threshold value and an offset of a ratio of a received energy per PN chip from a common pilot channel to a total received power spectral density at an antenna connector of said apparatus, for providing a received signal indicative of said a received signal code power threshold value and said offset for said ratio; and
   means for reselection, responsive to said received signal indicative of said received signal code power threshold value and said offset for said ratio, for establishing a first reselection criterion and a second reselection criterion for reselecting a further cell supported by a second radio access technology from said cell supported by the first radio access technology, wherein said first reselection criterion contains a threshold value comprising said ratio plus said offset added to said ratio, and said second reselection criterion contains said received signal code power threshold value, wherein said offset is not added to said ratio if said apparatus does not support said received signal code power threshold value.

31. The apparatus of claim 30, wherein said means for reselection is configured to determine if said reselection criterion is met for said cell supported by the second radio access technology and, if it is met, to reselect said further cell supported by the second radio access technology.

* * * * *

UNITED STATES PATENT AND TRADEMARK OFFICE
CERTIFICATE OF CORRECTION

PATENT NO. : 7,529,560 B2 Page 1 of 1
APPLICATION NO. : 11/129673
DATED : May 5, 2009
INVENTOR(S) : Sari Nielsen et al.

It is certified that error appears in the above-identified patent and that said Letters Patent is hereby corrected as shown below:

In column 11, line 27, claim 18, line 4, before "received" --a-- should be inserted.

Signed and Sealed this

Eighth Day of September, 2009

David J. Kappos
*Director of the United States Patent and Trademark Office*